United States Patent Office

3,267,933
Patented August 23, 1966

3,267,933
EKG COMPUTER
William E. Mills, Torrance, and Clifford Sanctuary, Rolling Hills Estates, Calif., assignors to Del Mar Engineering Laboratories, Los Angeles, Calif., a corporation of California
Filed Sept. 10, 1962, Ser. No. 222,272
20 Claims. (Cl. 128—2.06)

The present invention relates to means for processing electrical signals and more particularly to means for facilitating the visual observation of the waveforms of electrical signals and the measuring of various variables in such signals.

It is very frequently desirable to be able to observe the waveforms of repetitive signals that have similar waveforms but occur at random intervals and to be able to measure various characteristics thereof. For example, the expansions and contractions of the cardiac muscle produce electrical signals that circulate upon the body portion of the surface of a person's skin. These signals, which can be sensed by properly positioning electrodes on the surface of the skin, are the so-called electrocardiac or EKG signals. The waveshapes of these signals have many unkown relationships to the action of the cardiac muscle and to the condition thereof. By employing a suitable cathode ray oscilloscope, electrocardiograph or similar device, the waveshapes of the EKG signals may be visually presented for viewing. A highly trained person such as an electrocardiologist may then visually observe the electrocardiogram and endeavor to make a determination of the characteristics of the heart.

Although many heart disorders have been detected in this manner, it has been found that a failure to detect an abnormal EKG signal has not been an altogether reliable indication of a normal and healthy heart. Some forms of disorders, particularly during their early stages, produce abnormal EKG signals at only random or infrequent intervals and/or only when the patient is engaged in certain forms of activity. As a result, to obtain a record of such abnormal EKG signals, it is necessary to process electrocardiac signals occurring over an extended or protracted period of time while the patient is engaged in a wide variety of activities. Historically, it has been extremely difficult, if not impossible, to accumulate the required volume of EKG signals and especially where the patient is active. Moreover, where the required volumes of recordings have been obtained, it has been necessary for a highly trained person, such as an electrocardiologist, to laboriously review the individual waveforms and endeavor to evaluate the character of the EKG signals. This is a time-consuming process requiring a large amount of training. In addition, the accuracy of the evaluations is largely dependent upon the skill and personal judgment of the electrocardiologist.

In order to overcome this difficulty, it has been proposed to provide electrocardiographic means such as disclosed and claimed in copending patent application Serial No. 207,963, filed July 6, 1962, by Norman J. Holter and Wilford R. Glasscock for "Electrocardiographic Means," wherein visual displays of the waveforms of successive EKG signals are superimposed upon displays of preceding waveforms at a high rate of speed. Such means have been of great value in observing and analyzing EKG signals at a high rate of speed. They have also been of great value in improving the accuracy of detecting and identifying abnormal beats, especially when they occur at random and infrequent intervals. However, the accuracy of the analysis is still dependent upon the skill of an electrocardiologist and his ability to correctly evaluate the various characteristics of the waveforms.

It has also been proposed to provide electrocardiographic means such as disclosed and claimed in copending application Serial No. 224,969, filed September 20, 1962, by William E. Thornton for "Electrocardiac Computer." Such electrocardiographic means are not only capable of producing a visual display of EKG signals but are also responsive to one or more of the characteristics of electrocardiac signals and are effective to measure the values thereof. Although such means have been very effective in measuring the value of such characteristics as the occurrence of ectopic beats, ST segment depression, pulse rate, rhythm and others, it has been necessary to possess a certain amount of skill to operate the electrocardiographic means with a high degree of precision.

It is now proposed to provide means for observing and analyzing electrical signals that will overcome the foregoing difficulties. More particularly, it is proposed to provide electrocardiographic means that are not only simple to use and easy to operate, but will also produce a visual display of the waveforms of electrocardiac signals and will accurately measure the value of various characteristics therein. This is to be accomplished by providing electrocardiographic means wherein the waveforms of electrocardiac signals will be visually displayed on the screen of a cathode ray oscilloscope so that the successive waveforms will be superimposed on each other for direct visual comparison.

In addition, means may be provided for sampling the electrocardiac signal at one or more preselected portions thereof so that the amplitudes of said portions may be measured and/or compared with each other. At the same time, the sampling means will be effective to produce suitable markers on the oscillograph indicating the particular portions of the signals that are being sampled. As a result, the operator, while visually observing the display, may adjust the sampling means to select the particular portions of the electrocardiac signal that it is desired to sample and to obtain accurate measurements thereof.

These and other features, advantages and objects of the present invention will become readily apparent from the following detail description of one form of the present invention particularly when taken in connection with the accompanying drawings wherein like reference numerals refer to like parts, and wherein.

Figure 1:
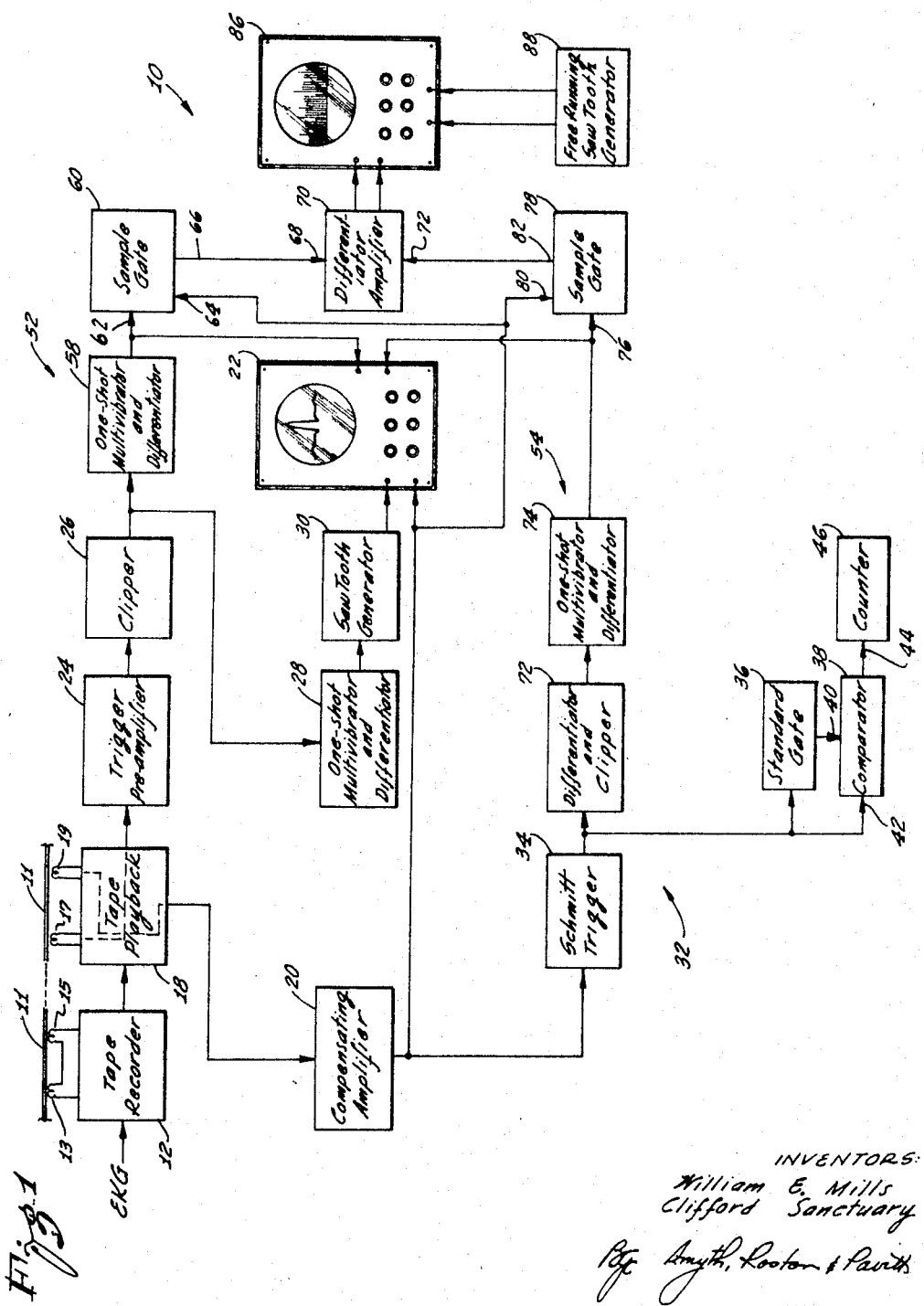
FIGURE 1 is a block diagram of electrocardiographic means embodying one form of the present invention.

Referring to the drawings in more detail, the present invention is particularly adapted to be embodied in electrocardiographic means 10 for displaying electrocardiac or EKG signals for observation and for measuring preselected characteristics of the signals. In the present instance, the electrocardiac means 10 includes an input portion for receiving the EKG signals from the patient. As will become apparent subsequently, it is desirable to provide a time delay for the EKG signal at the input. Accordingly, it is preferred to provide a tape recorder 12 for at least temporarily storing the EKG signals. This tape recorder 12 may be of a conventional variety for recording signals on a magnetic tape. More particularly, it may be a completely self-contained miniaturized unit suitable for being worn by a patient without materially interfering with his actions. This will permit the accumulation of large volumes of EKG signals while a patient is engaged in any desired type of activity. Alternatively, the recorder 12 may be of a larger variety disposed in the vicinity of the patient and connected thereto by any suitable means such as electrically conductive wires or a radio telemetering link.

In either type of recorder, there will normally be an input amplifier having one or more electrical conductors for being suitably connected to one or more electrodes secured to the patient so as to sense the EKG signals. The amplifier will be effective to increase the EKG signals to a level suitable for magnetically recording on a magnetic tape.

The amplifier is preferably of sufficiently high fidelity to insure the amplified signal therefrom being a faithful reproduction of the original EKG signal. Although the characteristic of the EKG signals may vary over a wide range, if the pickup electrodes are located in the so-called unipolar position on a normal or healthy person, the configuration of the EKG signals will be similar to the waveform 14 of FIGURE 2. More particularly, the typical or classical EKG signal includes, in the following sequence, a P wave, a QRS complex, a J point, and a T wave. Although there may be several additional waves present in a normal EKG signal, they will be ignored in the present instance as they will have little or no effect on the operation of the present invention.

The P wave is normally a small, positive pulse that corresponds to the intial impulse that triggers the commencement of the heartbeat. Shortly after the P wave, there is a quiescent portion that separates the P wave from the QRS complex and has a time duration of approximately 0.04 second. This portion is of substantially uniform amplitude and has been found to be a suitable isoelectric portion against which the remaining portions of the waveform may be compared.

The QRS complex which is substantially coincident with the actual expansion and contraction of the cardiac muscle producing the pumping action commences and terminates with the so-called Q and S waves, respectively. These waves are generally relatively small negative pulses, and are separated from each other by the intervening R wave. The R wave, which is the most conspicuous portion of the EKG signal has the appearance of a positive "spike." In a healthy heart, the rise and fall of this spike will be relatively fast and the interval between the half amplitude points will be on the order of up to 0.03 to 0.04 second. In the event the heart experiences a premature ventricular contraction that produces an ectopic beat, the duration of the R wave will be greatly increased so as to produce a waveform similar to the waveform 16 of FIGURE 2. In such a waveform, the duration of the R wave is usually on the order of at least twice as long as the normal R wave.

The T wave normally represents the ending of the heartbeat. The portions of the signal subsequent to the T wave are substantially quiescent and persist until the following EKG signal occurs as indicated by the commencement of the succeeding P wave.

The T wave is separated from the S wave by the ST segment. The so-called J point corresponds to the ending of the S wave and/or the beginning of the ST segment. In normal healthy hearts, the potential of the ST segment will be constant and approximately equal to the isoelectric reference portion between the P and Q waves substantially similar to waveform 14. However, in some forms of abnormal EKG signals, so-called ST segment depression may be present such as in waveform 16. When ST segment depression exists, the potential of the ST segment is excessively negative and is characterized by the amount that it is depressed below the isoelectric reference potential.

As previously stated, the input of the amplifier in the recorder 12 may be connected directly with the pickup electrodes by any suitable means such as a direct connection, a radio telemeter link, etc. The output signal from the amplifier will thus be a greatly amplified EKG signal. The amplifier is interconnected with means for magnetically recording the EKG signals directly onto a magnetic tape 11. In the present instance, this means includes a pair of recording heads 13 and 15 that are substantially identical to each other and are connected in series so that identical signals will flow through each. The two heads 13 and 15 are laterally displaced from each other so that the heads will record on separate parallel tracks. In addition, it is also desirable for the two heads 13 and 15 to be "staggered" or displaced longitudinally of the tape. As a result, recordings in the two tracks will be staggered. That is, the first or trigger track will be longitudinally displaced from the second or signal track by an amount corresponding to the longitudinal spacing between the heads 13 and 15. By way of example, in one operative embodiment, the recordings of the identical portions were displaced by approximately 1½ inches.

In order to recover the EKG signal in a form for further processing, tape playback means 18 may be provided. The playback means 18 may be a separate unit from the recorder 12 or it may be integral therewith. In order to operate the electrocardiac means 10 in a mode that will permit montioring of the EKG signals as they are occurring, it is desirable for the playback means 18 to be capable of reproducing the EKG signals at the same time they are being recorded. In order to operate the electrocardiac means in a mode that will permit monitoring large volumes of EKG signals in a very short interval of time, it is desirable for the reproduction means 18 to be capable of re-playing the tape at a speed that is much higher than the recording speed. By way of example, the recording speed may be on the order of 7½ inches per minute and the playback speed may be on the order of 7½ inches per second. By recording and playing back at these speeds, the frequency of the reproduced signals will be 60 times greater than the frequency of the original signal. As a consequence, one minute of playback time will represent sixty minutes or one hour of recording time and twenty-four hours of real time recordings may be reproduced in twenty-four minutes, thereby making it possible to review large volumes of EKG signals in reasonably short intervals.

The tape playback means 18 includes a pair of pickup heads 17 and 19 that are laterally displaced so as to separately scan the two recorded tracks. Each of the heads 17 and 19 will thus reproduce a signal corresponding to the original EKG signal. The pickup heads 17 and 19 may be "staggered" axially of the tape in a manner similar to the recording heads. This will avoid physical interference between heads. Thus, when the first or trigger track passes through the trigger head 17, it will produce a trigger signal that will lead the EKG signal resulting from the second track passing through the signal head 19 by a predetermined time interval. In other words, the EKG signal in the second pickup head 19 will be delayed from the trigger signal in the first head 17 by a predetermined time interval. By making one or both of the heads adjustable longitudinally of the tape 11, the amount of the time delay between the trigger signal and the EKG signal may be varied.

The signal head 19 is interconnected with means 20 for amplifying the signal to a more useful level. Since the signal reproduced by the signal head 19 is a result of the movement of the tape 11 through the head 19, the signal will be a derivative of the original EKG signal. Accordingly, in addition to being capable of amplifying the signal, the amplifier 20 preferably includes compensating means that will integrate the signal or otherwise restore it to its original form. Thus, the signal at the output of the amplifier 20 will be a signal that is substantially identical to the original signal.

The output of the amplifier 20 may be operatively interconnected with the input of the vertical deflection circuitry in suitable display means such as a cathode ray oscilloscope 22. The electron beam in the oscilloscope will thus be deflected vertically in response to the amplitude of the EKG signal from the amplifier 20.

The trigger head 17 may be operatively interconnected with the input to a trigger preamplifier 24 that is effective to amplify the signal from the trigger head 17 to a more useful level. Although the signal from the trigger head is a derivative of the original EKG signal, the amplifier 24 is preferably free of any form of compensating or integrating circuitry. Thus, the signal from the output of the amplifier 24 will still be a derivative of the original EKG signal. Normally, such a signal will include a large positive pulse corresponding to the beginning or the rapidly rising leading edge of the R wave. This will be followed by a large negative pulse corresponding to the rapidly falling or trailing edge of the R wave. It may thus be seen that this signal will include a positive pulse substantially coincident with the ending of the isoelectric portion between the P and Q waves and a negative pulse substantially coincident with the termination of the R wave and beginning of the S wave. As has been previously pointed out, this trigger signal will precede the EKG signal by a predetermined time interval determined by the amount of staggering of the two tracks and the staggering of the pickup heads.

The output of the trigger preamplifier 24 is interconnected with the input to a clipper circuit 26. This clipper circuit 26 may be of a substantially standard variety for suppressing or clipping all pulses of one polarity and permitting only pulses of opposite polarity to pass therethrough. By way of example, the present clipper may be effective to clip the pulses in the derivative signal corresponding to the commencement of the R wave and pass only the pulses therein corresponding to the termination of the R wave or beginning of the S wave.

The clipper circuit 26 may be connected to a combined multivibrator and differentiator 28. The multivibrator portion is preferably of the one-shot variety. Such a multivibrator will normally remain in one state until a triggering pulse is applied to the input thereof. When such a triggering pulse does occur, the multivibrator will change its state for a predetermined time interval and then return to its original state. Thus, a squarewave will be generated having a time duration determined by the various constants of the circuit. Preferably, one or more of these constants is adjustable so that the duration of the squarewave may be varied throughout a predetermined range.

The differentiating portion is effective to differentiate the squarewave and thereby produce a pulse of one polarity corresponding to the commencement of the squarewave and a pulse of opposite polarity corresponding to the termination of the squarewave. The timing between these pulses corresponds to the duration of the squarewave and, accordingly, by varying one or more of the time constants in the multivibrator, the timing delay between the pulses may be adjusted.

The trigger signals produced by the trigger pickup head 17 occur before the EKG signal. Accordingly, if the duration of the squarewaves is the proper amount, the pulses corresponding to the ending of the squarewave may be made to occur a predetermined period prior to the beginning of the EKG signals from the amplifier 20.

The output of the multivibrator-differentiator 28 may be interconnected with the input to a saw-tooth generator 30 such that the pulse coincident with the ending of the squarewave will trigger the generator. Each time the generator 30 is triggered, the potential of the output instantly returns to zero and then gradually increases at a substantially uniform rate until the generator 30 is again triggered or reset by a succeeding pulse on the input. Thus, each time a pulse occurs from the multivibrator-differentiator 28, the pulse will reset the generator 30 to zero and cause a new saw-tooth waveform to build up at a substantially uniform rate. It may thus be seen that the generator 30 will provide a saw-tooth wave each time a trigger signal is produced by the tape playback 18. However, this saw-tooth wave will be delayed from the trigger signal by a period equal to the duration of the squarewave in the multivibrator-differentiator 28.

The output of the saw-tooth generator 30 may be interconnected with the input of the horizontal deflection circuitry in the cathode ray oscilloscope 22. The saw-tooth wave will be effective to cause the electron beam to sweep across the face of the oscilloscope at a substantially uniform rate. Since the generator 30 will be triggered substantially coincident with the trailing edge of the squarewave pulse from the multivibrator 28, the horizontal sweep of the electron beam will be synchronized with the R wave from the trigger head 17. However, since the beginning of the sweep will be delayed by the duration of the squarewave in the multivibrator 28, the sweep will commence in a fixed time relation to the beginning of the EKG signal from the amplifier 20. Accordingly, by properly balancing the staggering of the tracks, the positions of the pickup heads and the duration of the squarewave in the multivibrator 28, the commencement of the horizontal sweep can be made to occur just prior to any desired portion of the EKG fed into the vertical circuitry of the oscilloscope 22. As a result, visual displays of the waveforms of the EKG signal may be produced on the face of the oscilloscope 22. Moreover, the beginning of each display may be synchronized to occur at the same point such that displays will be superimposed on each other.

It may thus be seen that by properly adjusting the multivibrator-differentiator 28, the horizontal sweep in the oscilloscope 22 will commence just prior to the time each EKG signal commences. As a consequence, even though the occurrence of the EKG signals is of a random or aperiodic nature, the displays of the waveshapes of the successive signals will be superimposed upon each other for visual observation and direct comparison with each other. In the event the tape playback 18 is operating at a sufficiently high rate of speed, there will be a sufficient persistence of the display to cause several of the waveforms to be visible at the same time. If all of the waveforms are substantially identical, the display will have a somewhat broadened appearance similar to the waveform 14 and all of the waveforms will be blended into a single display. Thus, the observer can monitor a large volume of EKG signals at a high rate of speed and compare and evaluate the EKG signals. Each time one or more EKG signal occurs that differs from the remaining EKG signals, a corresponding displaced waveform such as waveform 16 will at least momentarily flash on the face of the oscilloscope 22. This waveform will be outside of the pattern for the other waveforms. As a consequence, even an occasional erratic EKG will be apparent to an observer and he can quickly locate and evaluate such abnormalities.

If it is so desired, means may be provided to assist the observer in detecting certain types of abnormalities and measure various characteristics of the EKG waveforms. For example, a section 32 may be provided for detecting and recording the occurrence of ectopic beats such as may result from premature ventricular contractions. The waveform 16 is a typical waveform resulting from an ectopic beat. In such a beat, the configuration of the QRS complex and particularly the R wave therein is greatly altered or distorted from the normal configuration. More particularly, the R wave in an ectopic beat has a time duration much longer than the duration of a normal R wave. Although the time duration of an ectopic R wave varies throughout an extended range, it will normally persist for an interval on the order of at least 0.06 second. Accordingly, in the present embodiment, the occurrence of ectopic beats is determined by detecting the R wave having durations greater than the time required for a normal R wave.

In the present instance, the branch 32 is operatively interconnected with the output from the amplifier 20 so as to receive the EKG signal therefrom. The branch 32 includes a Schmitt trigger circuit 34. Such a circuit will normally remain in one state until such time as the potential at the input thereof exceeds a predetermined amplitude. When the input signal exceeds this level, the trigger circuit will switch to a second state and will remain in that state only as long as the input potential is above the trigger level. In the present instance, this trigger level is set above the maximum potentials of the various waves such as the P and T waves, but substantially less than the potential of an R wave. By way of example, the trigger level may be approximately equal to one-half of the peak or maximum amplitude of an ectopic R wave.

It may thus be seen that the signal from the output of the Schmitt trigger circuit 34 will be essentially a squarewave that commences substantially coincident with the beginning of the R wave and terminates substantially coincident with the ending of the R wave. Thus, the duration of this squarewave will be approximately equal to the duration of the R wave.

It has been found that in the event of a normal QRS complex, the squarewave at the output of the trigger circuit 34 will have a maximum time duration on the order of about 0.04 second or less. However, in the event of the occurrence of an ectopic pulse, the squarewave will have a minimum time duration on the order of at least 0.06 second.

The output from the Schmitt circuit 34 may be interconnected with any circuit means suitable for evaluating the time duration of the squarewave from the trigger circuit 34. Although there are a large variety of means suitable for accomplishing this objective, in the present instance, means are provided for determining whether or not the squarewave has a duration that is longer than a standard amount. In this embodiment, a standard gate 36 and a comparator 38 are employed. The standard gate 36 may be a conventional form of one-shot multivibrator that will change its state for a predetermined time interval each time a signal is supplied to the input thereof. Thus, the output signal from the gate 36 will be a squarewave of a standard duration. The duration of this squarewave should be slightly longer than a normal R wave and slightly shorter than an abnormal R wave.

As has been pointed out above, it is believed that the maximum time duration of the squarewave from the Schmitt trigger circuit resulting from the occurrence of a QRS complex produced by a normal heartbeat will not be greater than 0.04 second or substantially less than 0.05 second. However, the corresponding times for an abnormal or ectopic beat will be on the order of at least 0.06 second or substantially greater than 0.05 second. accordingly, the time constants of the standard gate 36 may be chosen so that the duration of the squarewave therefrom is somewhere between the maximum normal time duration and the minimum abnormal time duration. By way of example, it is believed that a pulse duration of 0.05 second will be suitable.

The comparator 38 may be a substantially conventional circuit that has two inputs 40 and 42 and is effective to compare the presence of signals at the inputs. For example, the comparator 38 may be a gate circuit that will open and close the input 42 in response to the presence of signals at the input 40. That is, if a signal is present at input 40, no signals will pass through from the input 42 to the output 44, but if the input 40 is free of signals, any signals at input 42 may pass through to the output 44. As another example, the comparator 38 may be a "NOT" circuit such as employed in the computer art. In such a circuit, the only time that a signal from the input 42 can pass through the comparator 38 is when there is not a signal present on the input 42. Thus, during the interval when the standard duration squarewave from the gate 36 is present at input 40, no signals can get through the comparator 38. However, after the squarewave terminates, any signals present at input 42 will also be present at output 44.

The output 44 from the comparator 38 is connected to a counter 46. The counter 46 is of a conventional variety and is effective to advance the count accumulated by one each time there is a pluse from the output 44.

The operation of the section 32 may be summarized briefly as follows. The EKG signal from the output of the amplifier 20 will be fed into the Schmitt trigger circuit 34. Normally, the potential at the output of the trigger circuit 34 will be low. However, whenever an R wave occurs at the input to the circuit 34, the circuit 34 will change its state for an interval corresponding to the duration of the R wave. The resultant squarewave will be simultaneously applied to the input of the standard gate 36 and to the input 42 of the comparator 38. The instant the squarewave from the trigger circuit 34 begins, the standard gate will switch its state for a fixed interval and product a squarewave pulse having a standard duration. The duration of the squarewave is between the time for a normal and the time for an abnormal beat and, by way of example, may be approximately 0.05 second. During this interval, even though there may be a signal present on the input 42, there will not be a signal present at the output 44. Accordingly, if R wave was from an EKG signal that was a normal, healthy one, the squarewave from the trigger circuit 34 will terminate before the pulse from the gate 36 and no signal will pass through the output 44 and the counter 46 will not be actuated. Accordingly, the accumulated count will remain the same. However, if an ectopic beat has occurred, the pulse from the Schmitt trigger will have a duration greater than the duration of the pulse from the gate 36. This, in turn, will result in a signal on the input 42 persisting longer than the signal on the output 44. Consequently, when the signal on the input 40 ceases, the signal on the input 42 will cause an output signal to appear at the output 44. This, in turn, will cause the counter to record an additional count. Accordingly, the counter 46 will be effective to accumulate a count representing the total number of ectopic beats that have occurred during the operation of the apparatus.

If it is desired to further assist the observer in detecting and evaluating additional characteristics, a section 50 may be provided. The present section 50 is particularly adapted to sense and indicate the relative amplitudes of two portions of the signal, for example, the amount of ST segment depression present in the EKG signal relative to the isoelectric portion.

Figure 2:
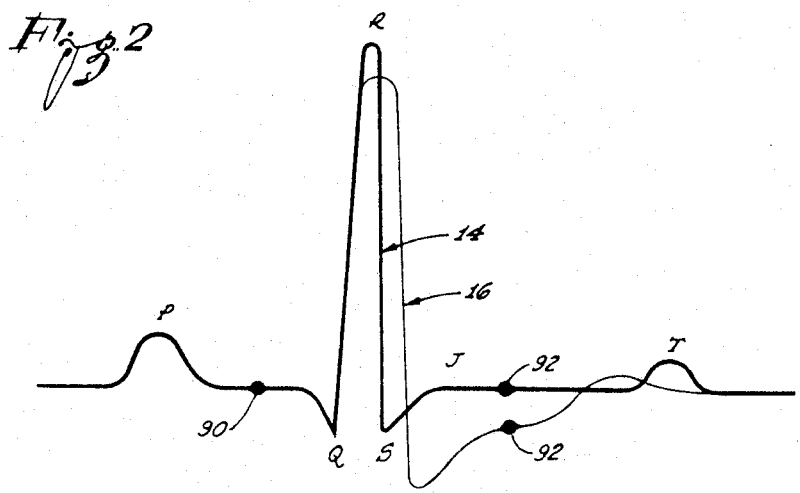
FIGURE 2 is a view of a typical display of electrocardiograms produced by the electrocardiographic means of FIGURE 1.

The waveform 14 of FIGURE 2 as previously stated illustrates an EKG signal produced by a healthy or a normal heart. It will be noted that following the S wave, the signal returns to approximately the same potential as the isoelectric reference potential between the P and Q waves. In addition, it has a substantially constant amplitude from the J point to the beginning of the T wave. The waveform 16 represents a typical abnormal EKG signal having a form of ST segment depression. More particularly, in waveform 16, the portions of the signal following the S wave do not return rapidly to the reference level, but instead, are considerably more negative or depressed from the isoelectric reference portion. In addition, the potential following the normal J point is not constant. In order to detect and measure this condition, the section 50 may include a first branch 52 that is effective to sense the amplitude of the ST segment and a branch 56 that is effective to compare these two amplitudes and indicate the differences, if any, therebetween.

The first branch 52 includes a one-shot multivibrator-differentiator 58 that has its input interconnected with the output of the clipper 26. As has been previously pointed out, the output signal from the clipper 26 is a short pulse that results from one of the pulses in the derivative signal produced by the trigger pickup head and each time a pulse appears at the output of the clipper 26, it will be synchronized with the EKG signal from the amplifier 20. More particularly, each pulse will precede the beginning of an EKG signal from the compensating amplifier 20 by a predetermined time interval.

The multivibrator portion of the multivibrator-differentiator 58 will respond to the pulses from the clipper 26 and produce a squarewave each time one of these pulses occurs. Although each of these squarewaves will have a predetermined time duration, the multivibrator portion is preferably adjustable to permit varying the duration of the squarewave. The squarewave is effective to produce a time delay such that the end of the squarewave in the multivibrator 58 will occur during a particular portion of each of the EKG signals from the compensating amplifier 20.

The differentiator portion is effective to differentiate the squarewave and produce a timing pulse that is substantially coincident with the termination of the squarewave. It may thus be seen that by varying the length of the squarewave, the timing pulse can be synchronized to occur simultaneously with a preselected portion of the EKG signal from the amplifier 20 and particularly that portion between the P and Q waves.

The output of the multivibrator-differentiator 58 is connected to one input 62 of a sample gate 60. The sample gate 60 may be of a conventional variety that has a pair of imputs 62 and 64 and is effective to sample and hold a signal proportional to the amplitude of the signal on the input 64 each time a timing pulse occurs on the input 62. More particularly, the sampling gate 60 may include a storage or memory device such as a condenser that will very rapidly accumulate and retain a charge having a potential equal to the potential of the sampled signal at the instant of charging. The second input 64 may be connected to the output of the compensating amplifier 20 so as to receive the EKG signal therefrom.

The output 66 from the gate 60 may be connected to one side 68 of a differential amplifier 70. This amplifier 70 may be of a conventional differential amplifier and effective to amplify the difference between the signals on the opposite sides 68 and 72 and to produce an amplified difference signal between the two outputs 84. It may thus be seen that each time an EKG signal occurs, it will be sampled at a particular time following its commencement. By varying the relationships of the heads 13 and 15 and heads 17 and 19 and the timing of the one-shot multivibrator 58, the sample may be taken during any particular portion such as during the isoelectric portion. The resultant sample signal will be applied to the input 68.

The second branch 54 which is effective to sense the amplitude of a second portion such as the ST segment is connected to the output of the Schmitt trigger circuit 34 and includes a differentiator-clipper circuit 72. The circuit 72 is connected to the output of the Schmitt trigger circuit 34 and, therefore, receives the squarewave developed within the trigger circuit 34. As was previously pointed out, this squarewave commences and terminates substantially coincident with the commencement and termination of the R wave in the EKG signal from the amplifier 20.

The differentiator portion of the circuit 72 is effective to differentiate the squarewave from the Schmitt trigger circuit 34 and thereby produce a first pulse of one polarity indicating the beginning of the R wave and a second pulse of another polarity indicating the ending of the R wave. The clipper portion will suppress one of the pulses and leave only the other pulse. Normally, the only pulse present at the output of the circuit 72 will be a trigger pulse indicating the ending of the R wave or the S wave.

The output of the differentiator-clipper circuit 72 is interconnected with the input to a one-shot multivibrator and differentiator 74. The multivibrator portion of the circuit 74 may be of a conventional variety for producing a single squarewave each time a trigger pulse occurs at the input. The duration of this squarewave, of course, depends on the parameters of the circuitry 74 and preferably, one or more of these parameters is adjustable so that the duration of the squarewave may be varied. The differentiator portion of the circuit 74 is effective to differentiate the squarewave and produce a pulse corresponding to the termination of the squarewave.

The time at which the terminal pulse occurs will be delayed from the ending of the R wave or beginning of the S wave by the duration of the squarewave in the circuit 74. As a consequence, by varying the duration of the squarewave in the circuit 74, the terminal pulse may be timed to occur at any particular point, for example following the R wave and during the ST segment.

The output from the multivibrator 74 is connected to the first input 76 of a sample gate 78. The sample gate 78 may be substantially identical to the sample gate 60. More particularly, the gate 78 may include a second input 80 and be effective to sample the signal on the input 80 at the instant a timing pulse occurs at the input 76. The second input 80 may be connected to the output of the amplifier 20 so as to receive the EKG signal therefrom. Thus, each time an EKG signal occurs, it will cause the gate 78 to sample the EKG signal subsequent to the S wave. Accordingly, the output from the gate 78 will be a signal proportional to the amplitude of the EKG at the instant the terminal or timing signal is created by the multivibrator-differentiator 74.

The output 82 of the gate 78 is connected to the second side 72 of the differential amplifier 70. This amplifier 70 will thus have a signal applied to one side that is proportional to the EKG sample signal in the first branch 52 and a signal on the other side proportional to the EKG sample signal in the second branch 54. The amplifier 70 will be effective to amplify the difference between these signals and produce a difference signal. This difference signal may then be fed to any suitable indicating means such as a conventional meter. However, in the present instance, the indicating means includes a visual display device such as a cathode ray oscilloscope 86. The horizontal deflection circuitry is connected to a free-running saw-tooth generator 88 that produces a saw-tooth waveform having a substantially uniform rate of increase. Accordingly, the electron beam will be swept across the face of the oscilloscope at a uniform rate. Preferably, the frequency of the generator is many times lower than the frequency of the EKG signal. This will result in a substantial number of EKG signals occurring during each sweeping cycle.

Figure 3:
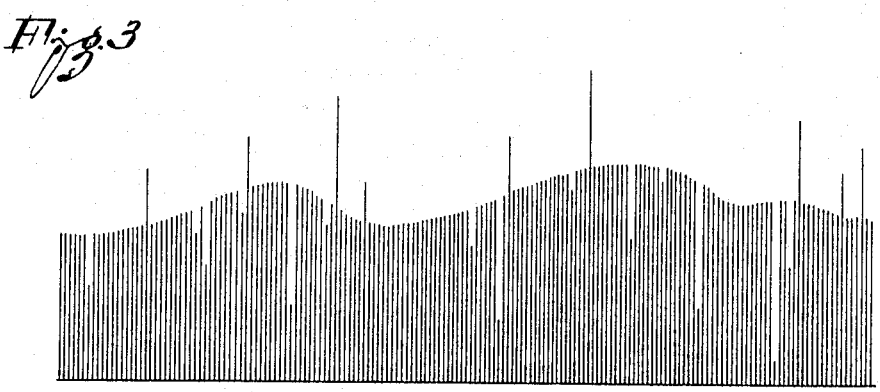
FIGURE 3 is a view of a typical display of one of the visual indications resulting from the measurements of one of the characteristics of an electrocardiac signal.

The vertical deflection circuitry of the oscilloscope 86 is connected to the output of the differential amplifier 70. It may thus be seen that as the electron beam is swept horizontally, it will also be deflected vertically by amounts corresponding to the differences between the signals from the branches 52 and which, in turn, correspond to the differences between the two sample signals as indicated by the bright spots 90 and 92. This will result in a visual display similar to that shown in FIGURE 3 and will consist of a plurality of vertical lines or displays. The zero point of the display will correspond to the setting of the position of the first sample gate indicated by the bright spot 90, and the vertical lines will be displayed above or below the zero line depending on the setting of the second sample gate indicated by the second bright spot 92. If there is no output from the differential amplifier 70, both bright spots 90 and 92 will appear at the same level, and the display will appear as a series of dots in a horizontal line on FIGURE 3. Each of these displays will correspond to the difference between a pair of signals. Preferably, the phosphors have a sufficient persistence to insure a substantial number of the lines remaining visible to permit an observer ascertaining the overall pattern of the difference signals.

The operation of section 50 may be summarized briefly as follows. As the tape 11 travels past the pickup heads 17 and 19 in the tape playback 18, a train of trigger signals will be produced which will be fed to the trigger pre-amplifier 24 and a train of EKG signals will be produced which will be fed to the compensating amplifier 20. Each of the EKG signals will be delayed from a corresponding trigger signal by a predetermined time interval. The time delay between corresponding signals will be a constant amount for any given setting of the pickup heads 17 and 19.

The trigger amplifier 24 will be effective to amplify the trigger signals and feed them to the clipper 26. Since the trigger signals are a derivative of the original EKG signal, they consist of a pair of pulses of opposite polarity corresponding to the beginning and ending of the R wave. The clipper 26 will be effective to suppress one of these pulses and leave the pulse of the opposite polarity. This pulse, in addition to actuating the multivibrator-differentiator 28 also actuates the multivibrator-differentiator 58. The multivibrator-differentiator 58 produces a squarewave and differentiates it to provide a timing pulse corresponding to the ending of the squarewave. By adjusting the multivibrator to vary the duration of the squarewave, the timing pulse can be delayed from the original trigger signal by any desired interval.

The timing pulse is fed to the input 62 of the sample gate 60 and will cause the gate 60 to sample the EKG signal present at the input 64 each time the timing pulse occurs. The signal at the output 66 will be first sample signals corresponding to the amplitude of the EKG signal at the time of the sampling.

The EKG signal from the output of the compensating amplifier 20 is fed through the Schmitt trigger circuit 34 and causes a squarewave to be generated that terminates substantially coincident with the QRS complex. This squarewave is fed through the differentiator-clipper 72 which produces a pulse substantially coincident with the end of the squarewave or the S wave. This pulse is then fed to the multivibrator-differentiator 74. The multivibrator-differentiator 74 will generate a squarewave and differentiate it so as to produce a timing pulse substantially coincident with the termination of the squarewave and, accordingly, this timing pulse will be delayed from the S wave by the length of the squarewave.

The timing pulse is applied to the input 76 of the sample gate 78 whereby the sample gate 78 will be caused to sample the EKG signal present at the input 80 and provide a second sample signal at the output 82 corresponding to the amplitude of the EKG signal at the time of the sampling.

The first and second sample signals are supplied to the inputs 68 and 72 of the differential amplifier 70. The amplifier will then produce output signals representing the differences between the corresponding sample signals. These difference signals will then be fed to the vertical deflection circuitry in the oscilloscope 86. As the free-running saw-tooth generator 88 causes the electron beam to sweep horizontally, vertical displays will be produced that correspond to the difference signals. Preferably, the sweep is sufficiently slow to insure the occurrence of a substantial number of differential signals occurring during each sweep. Thus, the display in the oscilloscope 86 will corrrespond to FIGURE 3 and will consist of a series of substantially vertical lines. The height of each of these lines will correspond to the amplitude of the difference signal or the amount of ST segment depression present in the EKG signal.

By adjusting the multivibrator-differentiator 58 to cause the squarewave therein to terminate between the P and Q waves, the gate 60 will be made to sample the EKG signal during the isoelectric reference portion between the P and Q waves. Accordingly, the sample signal from the gate 60 will correspond to the potential of the reference portion. To assist the operator in adjusting the multivibrator 58 and to insure the sample is being taken at the desired point, the output of the multivibrator-differentiator 58 may be interconnected with the cathode ray oscilloscope 22. Thus, the timing pulse that triggers the gate 60 will be effective to produce a visible marker on the display of the oscilloscope. This marker registers with the portion displayed in the waveform corresponding to the portion being sampled. Although the marker may be of any desired variety, it has been found desirable for the timing pulse to be applied to the oscilloscope so as to increase the intensity of the display. This, in turn, will produce a bright spot 90 at the sample point that will be readily apparent to the operator.

In addition, by adjusting the multivibrator-differentiator 74 to cause the squarewave therein to terminate during the ST segment, the gate 78 will be made to sample the EKG signal during the ST segment. Thus, the signal at the output 82 will correspond to the potential during the ST segment. In order to assist in adjusting the multivibrator 74 and to assure the sample being made during the desired portion of the ST segment, the output of the differentiator 74 may be connected to the oscilloscope 22 to apply the timing marker for the gate 78 to the oscilloscope. This will produce a second marker such as a bright spot that will register with a particular portion of the waveform being sampled.

As a consequence, the operator will have complete control over the sampling period and will have reliable knowledge of the sampling period at all times.

It will thus be seen that electrocardiac means have been provided which will be effective to produce a series of visual displays corresponding to the waveforms of the EKG signals such that an operator can readily observe and evaluate the EKG signals. In addition, the electrocardiac means will assist the observer in more accurately detecting and evaluating various characteristics of the EKG signal.

Although only a single embodiment of the present invention has been shown, it will be readily apparent to persons skilled in the art that numerous changes and modifications may be made thereto without departing from the spirit of the invention. Accordingly, the foregoing disclosure and description are for illustrative purposes only and do not in any way limit the invention which is defined only by the calims which follow.

What is claimed is:

1. In a device of the class described, the combination of:

time-delay means for receiving electrocordiac signals and providing a first train of trigger signals and a second train to EKG signals having P, Q, R, S and T waves substantially identical to the original electrocardiac signals, each of the EKG signals in said second train being delayed from a corresponding trigger signal in the first train by a predetermined time interval, display means operatively interconnected with said delay means and responsive to the EKG signals in said second train to provide visual displays of the waveforms of the successive EKG signals in the second train, said display means being responsive to said trigger signals to synchronize said display means so as to superimpose each of said displays on a preceding display, first sampling means operatively interconncted with said first time-delay means and including second time delay means responsive to the trigger signals in said first train, said second time delay means including a varible time delay to actuate said sampling means to sample each of the EKG signals in the second train during the isoelectric reference portion between the P and Q waves, and second sampling means including third time-delay means responsive to the ending of the QRS complex of the EKG signal in the second train, said third time-delay means including a variable time delay to actuate said sampling means to sample each of said EKG signals in the second train during the ST segment, each of said sampling means being operatively interconnected with said display means for producing visual displays on portions of the waveforms being sampled.

2. In a device of the class described for receiving electrocardiac signals from a source, the combination of:

time-delay means adapted to be interconnected with said source to receive the electrocardiac signals and provide a first train of trigger signals and second train of EKG signals having P, Q, R, S and T waves substantially identical to the original electrocardiac signals, each of the EKG signals in said second train being delayed from a corresponding trigger signal in the first train by a predetermined time interval, display means operatively interconnected with said delay means and responsive to the EKG signals in said second train to provide visual displays of the waveforms of the successive EKG signals in said second train, said display means being responsive to said trigger signals to synchronize said display means so as to superimpose each of said displays on a preceding display, first sampling means operatively interconnected with said first time-delay means and including second time delay means responsive to the trigger signals in said first train, said second time-delay means including a variable time delay to actuate said sampling means to sample each of the EKG signals in the second train during the isoelectric reference portion between the P and Q waves to provide reference signals, second sampling means including third time-delay means responsive to the ending of the QRS complex of the EKG signal in the second train, said third time-delay means including a variable time delay to actuate said sampling means to sample each of said EKG signals in the second train during the ST segment to provide ST signals, each of said sampling means being operatively interconnected with said display means for producing visual displays on portions of the waveforms being sampled, and means operatively interconnected with said sampling means to provide signals proportional to the differences between said reference and ST signals.

3. In a device of the class described for receiving electrocardiac signals from a source, the combination of:

input means adapted to be interconnected with the source for receiving said electrocardiac signals from the source and providing a first train of trigger signals and a second train of EKG signals, each of the EKG signals in said second train being similar to the original electrocardiac signals and delayed from a corresponding trigger signal in said second train by a predetermined time interval, first sampling means operatively interconnected with said input means and responsive to said trigger signals to sample each of said EKG signals in the second train during an isoelectric reference portion to provide a first sample signal, second sampling means operatively interconnected with said input means and responsive to the EKG signals in said second train and effective to sample each of said EKG signals in the second train during the ST segment to provide a second sample signal, means operatively interconnected with said sampling means for comparing the relative magnitudes of said sample signals and producing a signal indicative of the difference therebetween, and a cathode ray oscilloscope having the vertical deflection circuitry therein connected to said last means to provide a series of vertical displays proportional to the difference signals, the horizontal sweep circuitry in said oscilloscope having a sweep frequency that is slower than the frequency of the EKG signals in said second train.

4. In a device of the class described, the combination of:

magnetic tape playback means for reproducing previously recorded electrocardiac signals magnetically recorded on a tape, said playback means including a first pickup head positioned to provide a first train of trigger signals and a second pickup head positioned to provide a second train of EKG signals, each of the EKG signals in said second train being similar to the original previously recorded electrocardiac signal and being delayed from a corresponding trigger signal in said first train by a predetermined time interval, first sampling means operatively interconnected with said first and second pickup heads and responsive to said trigger signals to sample each of said EKG signals in said second train during an isoelectric reference portion to provide first sample signals, second sampling means operatively interconnected with said second pickup heads and responsive to said EKG signals in the second train and effective to sample each of said EKG signals in the second train during the ST segment to provide second sample signals, means operatively interconnected with said sampling means for comparing the relative magnitudes of said sample signals and producing signals indicative of the difference therebetween, and a cathode ray oscilloscope having the vertical deflection circuitry therein connected to said last means to provide a series of vertical displays proportional to the difference signals, the horizontal sweep circuitry in said oscilloscope having a sweep frequency that is slower than the frequency of the EKG signals in said second train.

5. In a device of the class described for analyzing particulars in the waveform of a series of aperiodic signals, the combination of:

input means for receiving each of the aperiodic signals in the series and including a first branch and a second branch, means in the first branch responsive to a particular portion in each of the aperiodic signals to produce a first train of aperiodic trigger signals wherein each trigger signal has a predetermined and constant time relation to the particular portion of a corresponding signal in the series, time delay means in the second branch responsive to each of the aperiodic signals in the series to produce a second train of signals, each of the signals in said second train being similar to a corresponding signal in the series but being delayed therefrom by a predetermined time interval whereby the trigger signals will occur at instants which are respectively prior in time for said predetermined time interval in relation to each occurrence of the said particular portion as it appears in the second train, and sampling means interconnected with the first and second branches, said sampling means being responsive to the trigger signals in the first train and effective to sample the signals in the second train in response to the trigger signals in the first train to provide a series of sample signals.

6. In a device of the class described for analyzing particulars in the waveform of a series of aperiodic signals, the combination of:

input means for receiving each of the aperiodic signals in the first series and including a first branch and a second branch, time delay means in the second branch responsive to each of the aperiodic signals in the series to produce a second series of signals, each of the signals in said second series being similar to a corresponding signal in the first series but being delayed therefrom by a first predetermined time interval, means responsive to a particular portion in each of the aperiodic signals in at least ones of said first and second branches to produce trigger signals each time that portion of the signal occurs to thereby respectively form a first train and a second train of aperiodic trigger signals wherein a first train trigger signal occurs prior in time than the corresponding particular portion in the second series, and a second train trigger signal occurs subsequently to said particular portion, and sampling means interconnected with the first and second branches to receive said trigger signals and said second series to sample the instantaneous values in the second series upon occurrence of the trigger signals.

7. In a device of the class described for analyzing particulars in the waveform of a series of aperiodic signals in which recurs a particular portion, the combination of:

input means for receiving each of the aperiodic signals in the series and including a first branch and a second branch, means in the first branch responsive to said particular recurring portion in each of the aperiodic signals in the series to produce a trigger signal each time that portion of an aperiodic signal occurs to thereby form a first train of aperiodic trigger signals wherein each trigger signal in the train has a predetermined time relation to a corresponding aperiodic signal in the series, time delay means in the second branch responsive to each of the aperiodic signals in the series to produce a second of aperiodic signals, each of the signals in said second train being similar to a corresponding signal in the series but being delayed therefrom by a predetermined time interval whereby each of the signals in the second train will follow the corresponding trigger signal by a constant time interval, first sampling means interconnected with the second branch and responsive to the signals in the second train, time delay means interconnected with the first branch and the first sampling means to transfer delayed trigger signals to the sampling means, said time delay means being effective to delay the trigger signals until a particular point in each of the signals in the second train, said first sampling means being effective to sample each of the signals in the second train in response to the delayed trigger signals and at the particular point in the second signals to provide a series of sample signals proportional to the second signals at the particular point, second sampling means interconnected with one of said branches and responsive to the series of aperiodic signals thereof to sample said latter aperiodic signal at a second particular point to provide a second series of sample signals proportional to the second signals at the second particular point, and comparing means interconnected with the first and second sampling means and responsive to the sample signals in the first and second series of sample signals, said comparing means being effective to compare the sample signals and provide a difference signal that is a function of the difference.

8. The combination of claim 7, wherein the comparing means includes a cathode ray oscilloscope having a display area effective to provide a visual display of a sequence of the successive difference signals.

9. In a device of the class described for receiving a series of aperiodically occurring electrocardiac signals wherein each of the signals normally includes an R wave having an amplitude that is greater than a predetermined amount, the combination of:

input means for receiving the series of electrocardiac signals, said input means being responsive to the amplitude of said electrocardiac signals to produce a trigger signal each time the amplitude of an electrocardiac signal exceeds said amount to thereby provide a first train of trigger signals, said input means including time delay means for providing a second train of EKG signals, each of the EKG signals in the second train being substantially identical to a corresponding electrocardiac signal in the series, said delay means having a time period effective to delay the beginning of the EKG signals in the second train until after the corresponding trigger signal in the first train, and sampling means interconnected with the input means and responsive to the trigger signals in the first train and the EKG signals in the second train, said sampling means being effective to sample each of the EKG signals in the second train at a particular point therein in response to each of the trigger signals in the first train to provide a series of sample signals that are proportional to the amplitude of the EKG signals in the second train at the particular point.

10. In a device of the class described for receiving a series of aperiodically occurring electrocardiac signals wherein each of the signals normally includes an R wave having an amplitude that is greater than the amplitude of the rest of the electrocardiac signals, the combination of:

input means for receiving the series of electrocardiac signals, said input means being responsive to the amplitude of said electrocardiac signals to produce a trigger signal each time the amplitude of the signal reaches the level of the R wave to thereby provide a first train of trigger signals, time delay means in said input means for providing a second train of EKG signals, each of the EKG signals in said second train being substantially identical to a corresponding electrocardiac signal in the series, said delay means having a time delay effective to delay the beginning of the EKG signals in the second train until after the corresponding trigger signal in the first train, an oscilloscope having a display area and first and second deflection systems for scanning the display area in two orthogonal directions, said first deflection system being interconnected with the input means and responsive to the trigger signal to commence a new scan in one of the directions each time a trigger signal occurs, said second deflection system being interconnected with the time delay means to scan in the second of the directions in response to the delayed EKG signals, sampling means interconnected with the input means and responsive to the trigger signals in the first train and the EKG signals in the second train, said sampling means being effective to sample each of the EKG signals in the second train at a particular point therein in response to each of the trigger signals in the first train to provide a series of sample signals that are proportional to the amplitude of the EKG signals at the particular point, and means interconnected with the sampling means and the oscilloscope to provide a marker on the display at the time of the sampling of the EKG signals in response to the trigger signals to thereby indicate the particular point in the EKG signal.

11. In a device of the class described for receiving a series of aperiodically occurring electrocardiac signals wherein each of the signals normally includes an R wave having an amplitude that is greater than a predetermined amplitude, the combination of:

input means for receiving each of the electrocardiac signals in the series and including a first branch and a second branch, amplitude responsive means in the first branch, said amplitude means being responsive to the instantaneous amplitude of each of the electrocardiac signals in said series to produce a trigger signal each time the amplitude of a signal in said series exceeds the predetermined amplitude to thereby form a train of trigger signals wherein each trigger signal has a predetermined time relation to a corresponding signal in the series, time delay means in the second branch effective to provide a second train of EKG signals in response to the electrocardiac signals in the series, said time delay means having a sufficiently long time delay to delay the being of each of the EKG signals in said second train until after a corresponding trigger signal in the first train, and sampling means interconnected with the first and second branches and responsive to each of the trigger signals in the first train and the EKG signals in the second train, said sampling means being effective to sample each of the EKG signals in the second train in response to the trigger signals in the first train and at a particular point in the EKG signals to provide a series of sample signals proportional to the EKG signals at the particular point.

12. In a device of the class described for receiving a series of aperiodically occurring electrocardiac signals wherein the amplitude of the signal is normally less than a predetermined amplitude except during an R wave, the combination of:

input means for receiving each of the electrocardiac signals in the series, a first branch in said input means, said branch being responsive to the amplitude of the signal to produce a trigger signal each time the amplitude of the signal exceeds the predetermined amplitude to thereby form a first train of trigger signals wherein each trigger signal in the train has a predetermined time relation to a corresponding R wave.

a second branch in said input means responsive to the electrocardiac signals and including a time delay means to produce a second train of EKG signals, said time means having sufficiently long time delays to prevent the beginning of the EKG signals in the second train until after the occurrence of a corresponding trigger signal in the first train, sampling means interconnected with the second branch and responsive to the EKG signals in the second train, and time delay means interconnecting the first branch with the first sampling means to transfer the trigger signals to the sampling means, said second time delay means being effective to delay the trigger signals to occur in synchronism with a particular point in each of the EKG signals in the second train, said sampling means being effective to sample each of the signals in the second train at the particular point in response to the trigger signals to provide a series of sample signals that are proportional to the EKG signal at the particular point.

13. In a device of the class described for receiving a series of aperiodically occurring electrocardiac signals wherein the amplitude of each signal is normally less than a predetermined amplitude except during an R wave, the combination of:

input means for receiving each of the electrocardiac signals in the series, a first branch in said input means responsive to the amplitude of the electrocardiac signals to produce a trigger signal each time the amplitude of an electrocardiac signal exceeds the predetermined amplitude during the R waves, said trigger signals forming a first train of trigger signals wherein each trigger signal in the train has a predetermined time relation to a corresponding electrocardiac signal, a second branch in said input means responsive to the electrocardiac signals, said second branch including time delay means to produce a second train of signals containing EKG signals, each of the EKG signals being similar to a corresponding electrocardiac signal, said time delay means having a time delay effective to delay the beginnings of the EKG signals until a predetermined interval after the corresponding trigger signal, first sampling means interconnected with the second branch and responsive to the delayed EKG signals in the second train, adjustable time delay means interconnecting the first branch with the first sampling means to transfer delayed trigger signals to the sampling means, said time delay means including a delay period that will cause the delayed trigger signals to occur during a preselected interval in the EKG signals, said sampling means being effective to sample each of the EKG signals in the second train in response to the trigger signals to provide a series of sample signals proportional to the EKG signals during the preselected interval, and second sampling means operatively interconnected with said second branch and responsive to the delayed EKG, said second sampling means being responsive to the signals in one of said trains to sample each of the signals in said second train during a second preselected interval to provide a second series of sample signals proportional to the EKG signals during the second interval.

14. The combination of claim 13, including:

comparing means interconnected with the first and second sampling means and being responsive to the difference between the sample signals in the first and second series of sample signals to provide difference signals that are a function of the differences between the EKG signal during the first and second intervals.

15. The combination of claim 14, wherein the comparing means includes an oscilloscope effective to simultaneously display a large number of successive difference signals.

16. In a device of the class described for processing a series of aperiodically occurring signals, the combination of:

magnetic tape recording means having a pair of recording heads for simultaneously magnetically recording the same signal on a magnetic tape, said heads being displaced laterally of the tape to record a first track and a second track, said heads being displaced longitudinally of the tape so that one of the tracks leads the other track by a predetermined distance, magnetic tape playback means having a first and a second pickup head positioned to respectively scan the first and second tracks and to provide similar phase shifted trains of reproduction signals, means connected to the first pickup head to derive a first train of trigger signals from a characteristic portion of the signal reproduced by the first pickup head; means connected to the second pickup head to provide a second train of signals similar to the aperiodically occurring signals in the original series, said playback heads being positioned longitudinally of the tape so that each of the signals in the second train will be delayed from a corresponding trigger signal in the first train by a predetermined time interval, and sampling means interconnected with said playback heads so as to be responsive to the signals in said first and second trains, said sampling means being effective to sample each of the signals in the second train in response to a corresponding trigger signal in the first train.

17. In a device of the class described for processing a series of aperiodically occurring electrocardiac signals wherein each of the signals in the series normally includes an R wave, the combination of:

magnetic tape recording means for receiving the electrocardiac signals, said recording means including first and second recording heads for simultaneously recording the same electrocardiac signals in a first track and a second track, said tracks being longitudinally displaced along said tape whereby the R wave in a signal in the first track is displaced from the R wave in a corresponding signal in the second track, magnetic tape playback means for reproducing the electrocardiac signals magnetically recorded on said tape, a first pickup head in said playback means positioned to scan the first track on the tape and reproduce a series of signals from the first track, trigger means interconnected with the pickup head and responsive to the R wave portions of the reproduced signals to provide trigger signals that form a first train of trigger signals, a second pickup head in said playback means positioned to scan the second track on the tape and provide a second train of EKG signals similar to the original electrocardiac signals, said recording and playback heads being displaced relative to each other so that each of the EKG signals will be reproduced a predetermined and constant time interval after the corresponding trigger signal in said first train, and sampling means interconnected with said trigger means and responsive to said trigger signals, said sampling means being interconnected with the second pickup head to receive the EKG signals, said sampling means being effective to sample each of said EKG signals in response to a trigger signal during a particular interval of each of the EKG signals to provide a sample signal from each EKG signal during the particular interval.

18. In a device of the class described for processing a series of aperiodically occurring electrocardiac signals wherein each of the signals in the series normally includes an R wave, the combination of:

magnetic tape recording means for receiving the electrocardiac signals, said recording means including first and second recording heads for simultaneously recording the same electrocardiac signals in a first track and a second track, said tracks being longitudinally displaced along said tape whereby the R wave in a signal in the first track is displaced from the R wave in a corresponding signal in the second track, magnetic tape playback means for reproducing the electrocardiac signals magnetically recorded on said tape, a first pickup head in said playback means positioned to scan the first track on the tape and reproduce a series of signals from the first track, trigger means interconnected with the pickup head and responsive to the R wave portions of the reproduced signal to provide trigger signals that form a first train of trigger signals, a second pickup head in said playback means positioned to scan the second track on the tape and provide a second train of EKG signals similar to the original electrocardiac signals, said recording and playback heads being displaced relative to each other so that each of the EKG signals will be reproduced a predetermined and constant time interval after the corresponding trigger signal in said first train, sampling means interconnected with said second pickup head and responsive to the reproduced EKG signals, and time delay means interconnected with the first pickup head and the sampling means to transfer delayed trigger signals to the sampling means, said delay means having a period that will cause the delayed trigger signals to occur during a particular interval of each EKG signal, said sampling means being effective to sample each of said EKG signals in response to a trigger signal to provide sample signals proportional to said EKG signal during said interval.

19. The combination of claim 18, including:

second sampling means interconnected with the second pickup head and responsive to the reproduced EKG signals, said second sampling means being responsive to the signals in one of said trains to sample each of said EKG signals during a second interval of the EKG signals to provide a second series of sample signals, comparing means interconnected with the first and second sampling means for comparing the relative magnitudes of said sample signals and producing difference signals indicative of the difference therebetween, and indicating means interconnected with the comparing means and responsive to the difference signals to indicate the magnitude of the difference.

20. In a device of the class described for processing a series of aperiodically occurring electrocardiac signals wherein each of the signals in the series normally includes an R wave, the combination of:

magnetic tape recording means for receiving the electrocardiac signals, said recording means including a first recording head and a second recording head for simultaneously magnetically recording a pair of tracks longitudinally of a tape, said tracks being substantially identical and containing the same signals, said recording heads being displaced longitudinally of the tape whereby the R wave portion of the signal in one track will be displaced from the R wave portion of a corresponding signal in the other track, magnetic tape playback means for reproducing the electrocardiac signals magnetically recorded on said tape, a first pickup head in said playback means positioned to scan the first track on the tape and reproduce a signal, trigger means interconnected with said pickup head to provide a trigger signal in response to each R wave portion of the reproduced signal to form a first train of trigger signals, a second pickup head in said playback means positioned to scan the second track on the tape and provide a second train of EKG signals similar to the original electrocardiac signal, said recording and playback heads being displaced relative to each other so that each of the reproduced EKG signals will commence a predetermined time interval after the corresponding trigger signal in the first train, first display means interconnected with the trigger means to begin a new display each time a trigger signal occurs, said display means being interconnected with the second pickup head whereby the display will include a waveform of the reproduced EKG signals, first sampling means interconnected with the second head and responsive to the reproduced EKG signals, delay means interconnecting the sampling means with the trigger means to transfer a delayed trigger signal to the sampling means, said delay means being effective to delay the trigger signals until a particular interval in the reproduced EKG signals, said sampling means being responsive to the delayed trigger signal and effective to sample each of said EKG signals during the particular interval to provide a series of sample signals for each EKG signal, second sampling means interconnected with the second pickup head and responsive to said EKG signals, said second sampling means being effective to sample each of said EKG signals during a second interval of the EKG signal to provide a second series of sample signals, comparing means interconnected with said first and second sampling means for comparing the relative magnitudes of said sample signals and producing a series of difference signals indicative of the difference therebetween, and second display means interconnected with said comparing means and responsive to the difference signals to provide a series of displays proportional to the difference signals.

References Cited by the Examiner

UNITED STATES PATENTS

| | | | |
|---|---|---|---|
| 2,620,890 | 12/1952 | Lee et al. | 340—174.1 |
| 2,674,660 | 5/1954 | Ambrose | 340—174.1 |
| 2,706,810 | 4/1955 | Jacobsen | 340—167 |
| 2,774,056 | 12/1956 | Stafford et al. | 340—149 |
| 2,902,644 | 9/1959 | McDonald | 324—88 X |
| 2,905,894 | 9/1959 | Rudmann | 324—77 |
| 2,916,724 | 12/1959 | Peterson | 324—77 X |
| 2,924,777 | 2/1960 | Liu | 324—88 X |
| 2,950,463 | 8/1960 | Brunn | 340—167 |
| 2,951,181 | 8/1960 | Sugarman | 324—77 X |
| 2,951,985 | 9/1960 | Hudson | 324—88 X |
| 3,030,946 | 4/1962 | Richards | 128—2.06 |
| 3,048,166 | 8/1962 | Rodbard | 128—2.06 |
| 3,087,487 | 4/1963 | Clynes | 128—2.1 |
| 3,087,488 | 4/1963 | Streimer | 128—2.05 |

FOREIGN PATENTS 585,909   2/1947   Great Britain.

RICHARD A. GAUDET, *Primary Examiner.*

L. R. PRINCE, *Examiner.*

S. BRODER, *Assistant Examiner.*